F. P. MURPHEY AND C. E. BICKEL.
CHAIN ATTACHING DEVICE.
APPLICATION FILED APR. 3, 1920.
1,380,921.
Patented June 7, 1921.
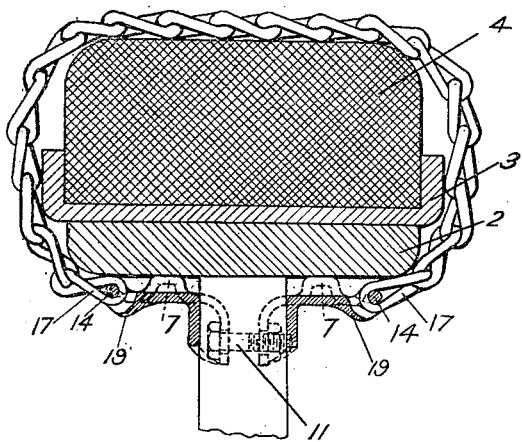
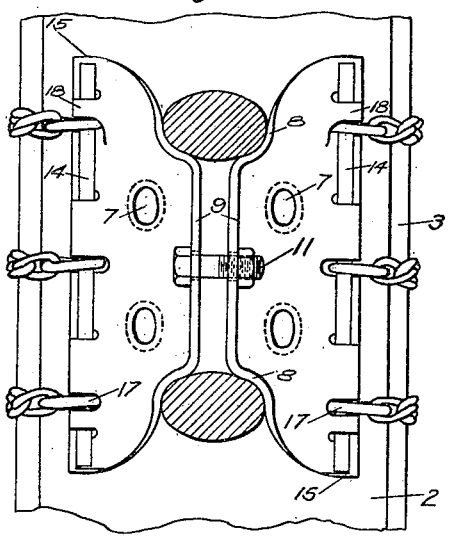
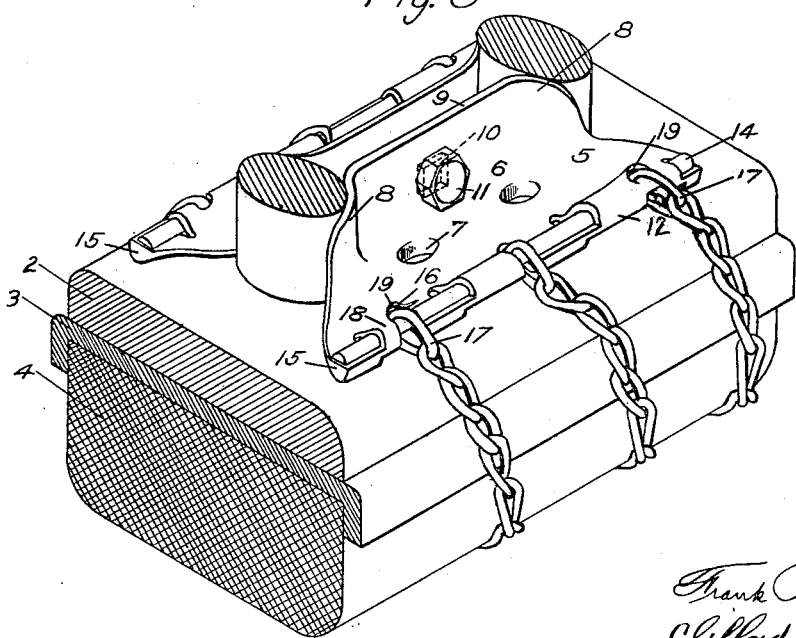

UNITED STATES PATENT OFFICE.

FRANK P. MURPHEY AND CLIFFORD E. BICKEL, OF BUTLER, PENNSYLVANIA.

CHAIN-ATTACHING DEVICE.

1,380,921.  Specification of Letters Patent.  Patented June 7, 1921.

Application filed April 3, 1920. Serial No. 371,012.

*To all whom it may concern:*

Be it known that we, FRANK P. MURPHEY, and CLIFFORD E. BICKEL, residing at Butler, Butler county, Pennsylvania, have invented a new and useful Improvement in Chain-Attaching Devices, of which the following is a full, clear, and exact description.

The present invention relates broadly to traction chains for automotive vehicles, and more particularly to an attaching device therefor.

The principal object of the present invention is to provide an attaching device in the form of plates having means for the attachment of the cross chains. Another object of the invention is to provide plates of the nature referred to which are so shaped that they conform generally to the shape of the wheel spokes between which they are adapted to be clamped.

The foregoing and other objects, together with their attendant advantages, will be apparent as the invention becomes better understood, by reference to the accompanying specification and drawings forming a part thereof, it being premised that changes may be made in the various details and the manner of operation, within the scope of the appended claims, without departing from the spirit of the invention.

In the drawings:

Figure 1 is a radial section through a portion of a wheel equipped with our improved device;

Fig. 2 is a detail section through a pair of adjacent spokes having our improved device secured therebetween; and Fig. 3 is a perspective view of the device in position.

Referring more particularly to the drawings, there is illustrated a vehicle wheel having the usual felly 2, carrying a rim 3, of any usual construction, for either a solid or pneumatic tire 4. Our attachment comprises for each set of cross chains a pair of plates 5, having a curved body portion 6, provided with projections or lugs 7, adapted to coöperate with the inner surface of the felly 2. Extending at an angle to the main body 6 is an upstanding spoke-engaging member 8, having its opposite ends curved slightly to conform generally to the curvature of spokes of ordinary construction. The intermediate portions 9 of each of the plates may be pressed inwardly and provided with openings 10, through which an attaching bolt 11 may be passed to clamp the device firmly in position on opposite sides of the spokes. It will be obvious that in place of the bolt 11, we may substitute any well known form of attaching member.

The edges of the main body members of each of the plates, which are preferably so dimensioned as to lie within the plane of the rim 3, are provided with suitable bearings 12, for a longitudinally extending rod 14. The end of the plates adjacent one of the ends of the rods 14 may be provided with lugs 15, which may be bent upwardly to prevent accidental displacement of the rod. Each of the plates 5 is also preferably provided with a series of openings 16, through which the end links 17 of the cross chains may pass. In order to give a uniform bearing surface to the rods 14, the bearings 12 are preferably arranged to extend alternately above and below the rods, so that only comparatively short portions thereof on opposite sides are left without support. The end bearings 18 are preferably formed with curved guards 19, extending over the adjacent links 17 and emerging into the main body of the plates, whereby a brace is provided for these end bearings.

From the foregoing, it will be apparent that we have provided a device adapted to carry a plurality of cross chains, which chains may be readily removed to permit the insertion of new chains by sliding the rods longitudinally from the bearings. By reason of this construction, a device is provided forming convenient means for the attachment of a plurality of cross chains.

The advantages of the present invention result from the provision of a structure permitting ready attachment of the device, and which attachment may be made between any spokes desired, to equalize the wear on the tire. Further advantages arise from the rigid means for securing the ends of the chains, whereby rolling of the chains under tractive influences is prevented.

We claim:

1. A chain-attaching device, comprising a plate having spoke-engaging portions, a plurality of bearings formed therein, bracing guards coöperating with certain of said bearings, and a chain-attaching rod in said bearings, substantially as described.

2. A traction device for vehicles, comprising plates adapted to be secured on opposite sides of adjacent spokes, said plates each having generally diverging spoke-engaging members formed thereon, rods removably carried by each of said plates and supported throughout substantially their entire length by said plates, and a plurality of longitudinally spaced chains having their opposite ends secured to said rods, substantially as described.

3. A traction device for vehicles, comprising a pair of coöperating plates having body portions adapted to lie within the plane of the wheel rim, means carried by each of said plates for engaging a pair of adjacent spokes, means for clamping said plates in spoke-engaging position, said plates each having portions of their outer edges curved upwardly to form rod-receiving bearings, and having portions of the edges cut away to form chain-receiving openings, longitudinally extending rods carried by the bearings in said plates, and a plurality of cross chains having their ends extending through said openings and secured to said rods, substantially as described.

4. A traction device for vehicles, comprising a pair of coöperating plates having body portions adapted to lie within the plane of the wheel rim, means carried by each of said plates for engaging a pair of adjacent spokes, means for clamping said plates in spoke-engaging position, said plates each having portions of their outer edges curved upwardly to form rod-receiving bearings, and having portions of the edges cut away to form chain-receiving openings, longitudinally extending rods carried by the bearings in said plates, a plurality of cross chains having their ends extending through said openings and secured to said rods, and means for preventing longitudinal movement of said rods, substantially as described.

5. A traction device for vehicles, comprising a pair of coöperating plates having body portions adapted to coöperate with a wheel felly, means carried by each of said plates for engaging a pair of adjacent spokes, means for clamping said spokes in spaced spoke-engaging position, said plates each having portions of their outer edges curved upwardly to form rod-receiving bearings and having longitudinally spaced portions of the edges cut away to form chain-receiving openings, longitudinally extending rods carried by the bearings in said plates and extending across said openings, said plates being in engagement with said rods throughout substantially their entire length to support the same, and a plurality of cross chains having their ends extending through said openings and secured to said rods, substantially as described.

In testimony whereof, we have hereunto set out hands.

FRANK P. MURPHEY.
CLIFFORD E. BICKEL.